Sept. 22, 1959 R. G. CHEESEBORO 2,905,475

VEHICLE RECORD PLAYER

Filed Feb. 24, 1956 3 Sheets-Sheet 1

INVENTOR.
ROBERT G. CHEESEBORO
BY J. P. Keiper
ATTORNEY

INVENTOR.
ROBERT G. CHEESEBORO
BY [signature]
ATTORNEY

Sept. 22, 1959 R. G. CHEESEBORO 2,905,475

VEHICLE RECORD PLAYER

Filed Feb. 24, 1956 3 Sheets-Sheet 3

INVENTOR.
ROBERT G. CHEESEBORO
BY F. P. Keiper
ATTORNEY

United States Patent Office 2,905,475
Patented Sept. 22, 1959

2,905,475

VEHICLE RECORD PLAYER

Robert G. Cheeseboro, Rochester, N.Y.

Application February 24, 1956, Serial No. 567,642

18 Claims. (Cl. 274—9)

This invention relates to phonograph record players and more particularly to a player adapted for use on automotive vehicles and relatively insensitive to shock.

Record players for automotive vehicle mounting should operate satisfactorily despite road shock, acceleration, both forward and sidewise, and deceleration and should operate with a minimum of attention on the part of the driver, so that the insertion of a record for playing, can be effected without the driver's attention from the highway.

The present invention is directed to an automotive vehicle record player, in which the record is automatically clamped in position, when inserted, and in which the needle cartridge and carriage means have as little weight as possible, and in which free traverse, as well as sufficient yield is provided whereby, the cartridge and its carriage is substantially insensitive to inertia effects due to shock and vehicle change of motion. The invention is further directed to a record turntable and clamping mechanism, and a system for automatic operation upon the insertion of a record, and the automatic ejection of the record when play is completed.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figures 1, 2:
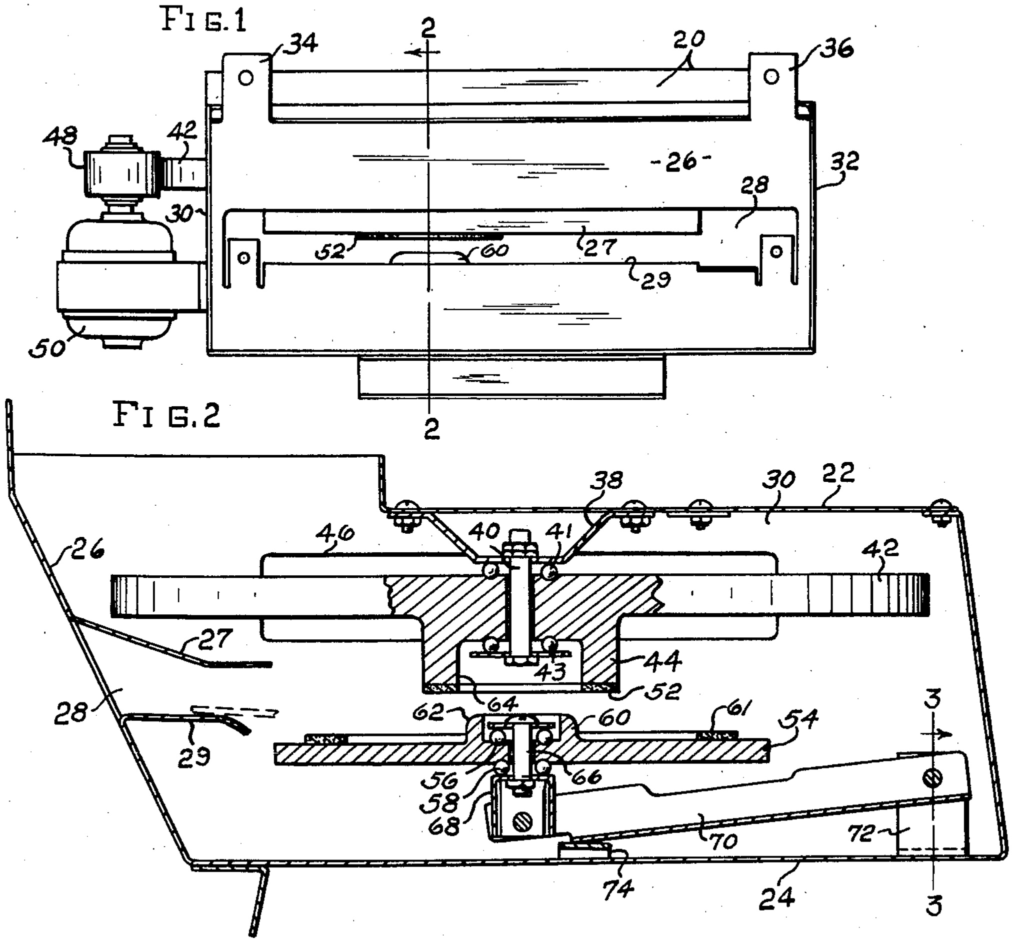
Figure 1 is a front elevational view of the record player.
Figure 2 is a sectional view of the record player taken substantially on the line 2—2 of Figure 1.
Figure 3:
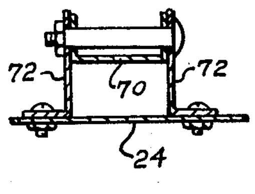
Figure 3 is a fragmentary sectional view taken on the line 3—3 of Figure 2.

Referring to Figures 1 and 2, there is shown a casing 20, having top and bottom walls 22 and 24, a front wall 26, having a slot 28 for the insertion and removal of records, side walls 30 and 32, and mounting brackets 34 and 36, for mounting the player in the dash of an automotive vehicle, with the front wall 26, facing rearwardly toward the driver or other occupants of the vehicle front seat. The aperture or slot 28 is provided with inwardly directed flanges 27 and 29 to form a guide throat for the records upon insertion.

Within the casing and suspended from the top wall 22 is a bearing bracket 38, and bearing shaft 40, on which is rotatably mounted on bearings 41 and 43, a friction drive disc 42, having a depending annular record engaging friction drive face 44. The rim of the friction drive disc may project through an opening 46 in the side wall 30 and engage the friction drive wheel 48 of a constant speed drive motor 50. The drive face may have applied to it, an annular soft rubber gripping ring 52, which when in engagement with the top surface of a record, will assume non-slip drive thereof.

A record supporting turntable 54, in axial alignment with the drive disc 42 is provided therebelow, and is raised or lowered to hold or release a record. The turntable is rotatably mounted on bearings 56 and 58, and has a central annular shoulder or hub 60 adapted to project through the central aperture of a standard 45 r.p.m. or other record. Radially outwardly spaced from the hub 60 is an annular soft rubber ring 61, adapted to engage the underside of a record, when positioned between the turntable and gripping ring 52. The hub 60 has a bevelled or rounded outer upper edge 62, to facilitate its projection through a record aperture, and such hub is adapted to project into the cavity 64 defined by the annular drive face 44, when the turntable is elevated to clamp a record R between the soft rubber rings 52 and 61. The bearings 56 and 58 are mounted on a stub shaft 66 which extends upwardly from, and is secured to, a relatively square, hollow block member 68. The latter is pivotally mounted upon a fore and aft extending lever arm 70, pivotally mounted on a bracket 72 mounted on the bottom wall 24. Such lever is of channel cross-section.

In order to raise or lower the turntable, a bell crank 74, having upwardly extending ears 76, and a horizontally extending tongue 78 is provided, such bell crank being pivoted as at 80, on a bracket 82 mounted on the bottom wall. The tongue is curved as at 84 and projects beneath the web of the channel sectioned arm 70. Rocking the bell crank will be seen to effect the raising or lowering of the turntable.

Figure 4:
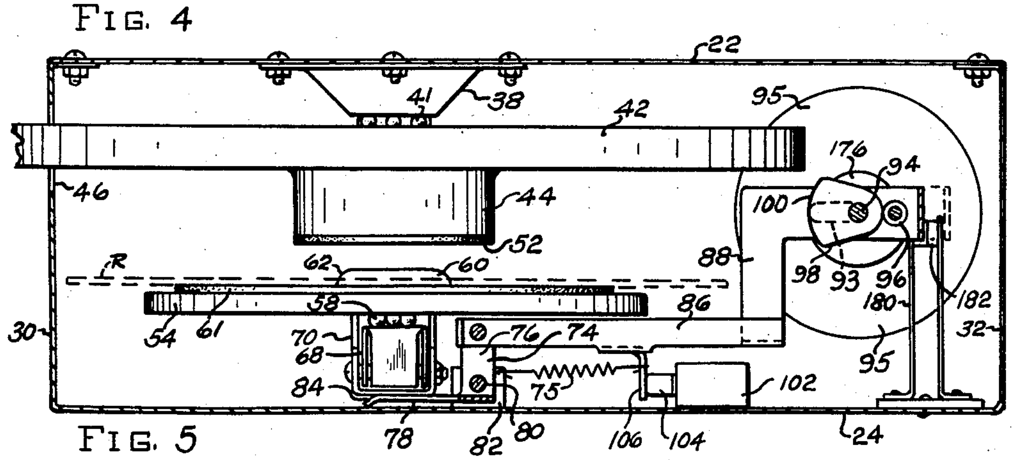
Figure 4 is a side elevational view with the casing wall and other parts removed to show the turntable lift mechanism.

In order to rock the bell crank, there is provided a laterally extending link 86 having an offset 88 (see Figure 5), from which extends laterally spaced arms 90 and 92, offset upwardly from the offset 88. Such arms are provided with horizontal slots 93 to receive the end of a shaft 94 of a high torque motor 95. The shaft acts as a guide to constrain the movement of the link 86 to horizontal lateral movement as is indicated in Figure 4. Between the spaced arms 90 and 92 is a pivoted cam roller 96, which is adapted to engage a cam 98 affixed to the motor shaft 94. In Figure 4, the lobe 100 of the cam is shown as extending to the left, and the link 86 is shown to the left, in turntable lowered position. On rotation of the motor shaft 94 through about 180°, the lobe of the cam is rotated so as to extend to the right, and the link 86 is thereby cammed to the right and the turntable thus raised to rotatably clamp a record against the drive disc. Upon a further rotation of about 180° of the shaft 94, the link is allowed to move to the left, and the turntable lowered to the position in which it is shown.

Actuated by the link 86 is a double pole single throw switch 102 of the overcenter type, such switch being conveniently mounted on the bottom wall and having a switch actuating arm 104 connected to a lug or arm 106 on the link 86. The switch is such as to be actuated from one position to the other, that is the open or closed circuit positions, just before the link reaches the end of the movement. One of the circuits of such switch, in circuit with the motor 95 driving the cam 98, tends to break the motor circuit and allow the motor to rotate the cam sufficiently by inertia, to bring the cam to the position shown, as will be more in particular set forth hereinafter.

The needle cartridge 110, having a stylus 112 to engage the spiral sound track of a record is mounted for lateral movement above the record, such movement being crosswise of the forward motion of the vehicle. Such cartridge has oppositely extending side flanges 114 and 116 to which are secured V spring wires 118 and 120. The ends of such wires are bent as at 122 to extend laterally of the vehicle motion, and are again bent at right angles to provide aligned pintles 124 and 126, which extend into end bores of shouldered rollers 128 and 129. Such rollers may be formed of nylon or other suitable material. The ends of the rollers are of reduced diameter as at 130, to provide thrust shoulders 132. The roller ends are received in a pair of spaced tracks 134 and 136, each formed from top and bottom parallel extending members 133 and 135 which are rigidly spaced by a distance slightly greater than the diameter of the reduced roller ends. The tracks are rigid, and rigidly tied together by cross members 138 and 140 at either end, one end of the guideway formed by the tracks is rigidly secured to a bracket 142 extending to and rigidly mounted on the bottom wall 24. A lateral brace 141 extending across the casing may also be provided.

It will be seen that when the record is positioned between the drive plate and turntable and the turntable is raised to its elevated position, the stylus will engage the record sound track. The stylus and its cartridge will be free to move inwardly in response to the radial side thrust of the record groove on the stylus. Such cartridge being mounted on the yielding wires 118 and 120 and the rollers 128 and 129 is free to move toward the center as the record is being played and also free to yield vertically. The line of travel of the stylus will preferably be located slightly to one side of a transverse radius of the record as is indicated so that the record engagement with the needle, as the record turns will provide a slight component of force tending to move the cartridge roller assembly inwardly in response to the inward feed of the spiral sound track groove of the record. The shoulders on the rollers will absorb the carriage thrust.

The resilient support wires 118 and 120 for the cartridge may have a circular loop 140 formed therein by which such wires are secured to the flanges 114 and 116 by screws 142.

In order to initiate operation of the mechanism, when a record is inserted between the drive disc and turntable, there is provided at the back of the casing a pivotal arm 144, having spaced rollers 146 and 148 adapted to engage the edge of a record, and embrace an arcuate portion thereof. Such arm is pivoted as at 150, on a bracket 152 mounted on the bottom wall 24 of the casing. The arm is provided with a tension spring 153 to yieldingly urge the arm in a record ejecting direction, and the arm and bracket are provided with contacts 154 and 156, adapted to be closed upon the insertion of a record a proper distance so as to be coaxial with the disc and turntable whereby the record can be gripped. The contact 156 is yieldingly mounted so as to close just immediately prior to the record assuming such coaxial position, and so that once the record is clamped between the turntable and drive disc, the contacts will be held closed by the rim of the record bearing on the rollers, and the slight yield of the contact 154.

The arm 144 is provided with a finger 158 which is adapted to engage a lateral projection 160 of a cartridge return sweep 162, such sweep being pivotally mounted as at 164 on the bottom wall 24. The end of such sweep is rounded as at 166 to engage the roller 128 of the cartridge carrier, and the arm may project and swing between the top and bottom track members 133 and 135. A light spring 168 normally holds the sweep in the position as shown in Figure 4. When the turntable is lowered, the record is ejected from the turntable, as a result of the tension of spring 153 which causes the arm to swing forward to effect ejectment as soon as the record is freed by the separation of the turntable and drive disc. At such time, the finger 158, swings the sweep arm to the right, moving the cartridge carriage to the position shown in Figure 5. A suitable stop 170 mounted on the cross member 140 is provided to engage the right roller 129, so that the carriage will be properly positioned to engage the outermost groove of a record, when subsequently inserted for playing and when such record is lifted by the turntable in its upward movement to effect clamping. The spring 168 will be lighter than spring 153, so as to be overpowered by the movement of the arm 144 in ejecting a record.

On the member 138 of the carriage guide is mounted a sensitive switch 172 having contacts 173, such as a micro switch, such switch having an arm 174 adapted to be engaged by the roller 128, when the carriage reaches the end of play position, and such switch, as will be seen hereinafter, initiates action to lower the turntable, resulting in record ejectment.

Figures 6, 7:
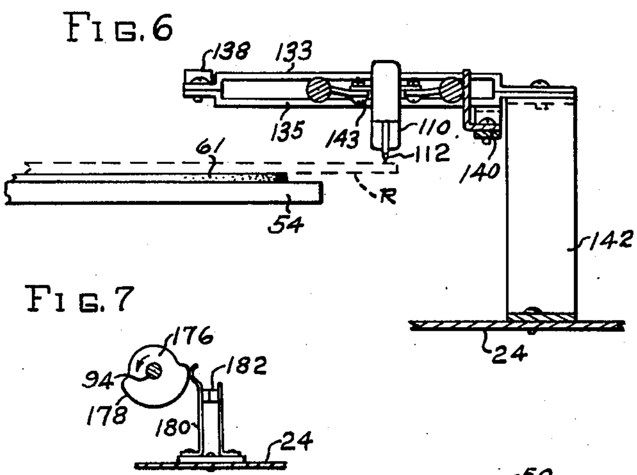
Figure 6 is a fragmentary sectional view taken substantially one the line 6—6 of Figure 5.
Figure 7 is a sectional end elevational fragmentary view of a cam switch on the lift motor shaft.

Mounted on and affixed to the motor shaft 94 is a cam 176, having an arcuate lobe 178 of about 180° arcuate length. Such lobe, when in engagement with the contact finger 180, closes the contacts 182. The lobe is angularly disposed in relation to the cam 98, so that when the turntable reaches the lower position, the cam 178 has reached the position shown in Figure 7 with the contacts 182 closed.

When a record is inserted into position, the rollers 146 and 148 of the lever arm 144 are engaged by the record edge and tend to center the record laterally. The contacts 154 and 156 are closed by such engagement. At such time, as can be seen by referring to Figure 8, the contacts 200 and 202 of the double pole single throw switch are open, and the cam contacts 182 are closed. Assuming the "on and off" switch 204 to be closed, current flows through contacts 154 and 156 and contacts 182 to energize the clamp motor 95. Such motor rotates cam 98 from the position shown in Figure 4 to a diametrically opposite position shifting the link 86 to the right and lifting the turntable to clamp the record. As soon as the clamp motor has rotated 180°, the cam actuated contacts 182 are opened, and the clamp motor stops with the roller 96 resting on the arcuate portion 100 of the cam 98.

As the link 86 moves to the right, and approaches the end of its travel the switch contacts 200 and 202 are closed. Contacts 202 when closed, establish a circuit to the record drive motor 50 and rotation of the drive disc and record and turntable is thereby effected.

Figure 5:
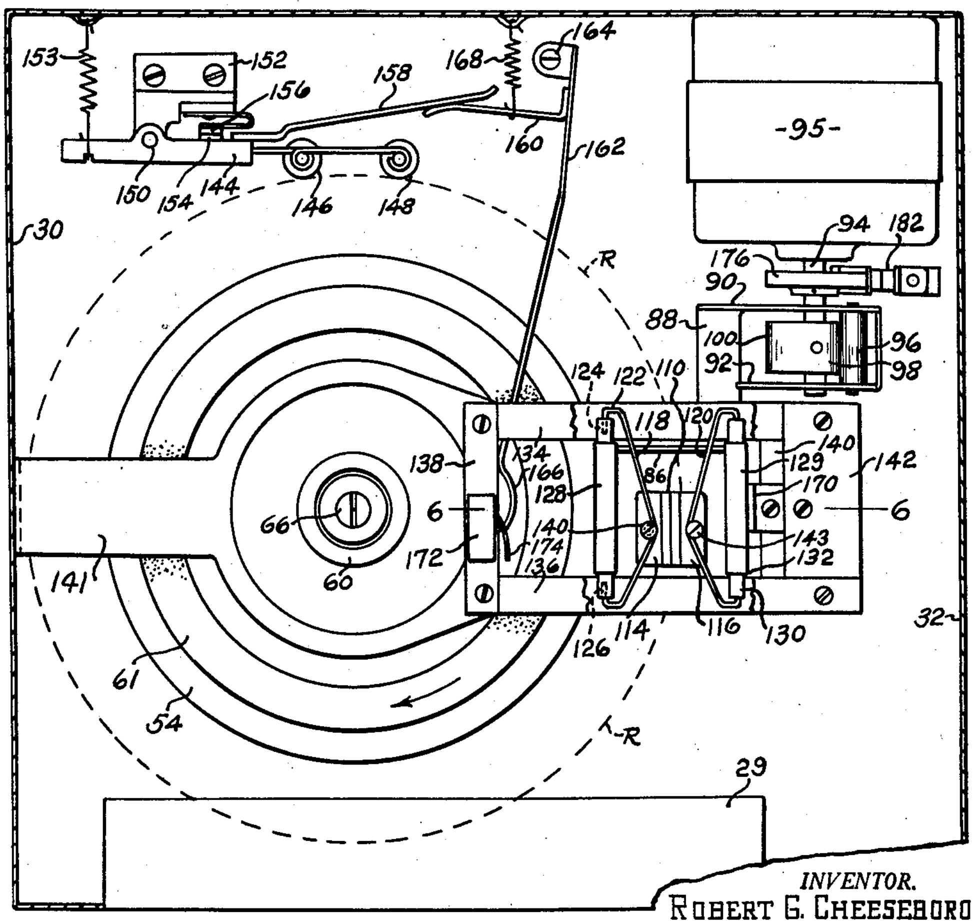
Figure 5 is a plan view of the turntable and needle carriage with the casing top and parts removed.

At the conclusion of the record play period, the stylus cartridge has moved to the left from its position shown in Figure 5, and actuates switch 172 closing contacts 173. A circuit is thus established through contacts 173, and contacts 200, to again energize the clamp motor 95. Rotation of the cam 98 allows the link 86 to move to the left as soon as the roller 96 rides off the arcuate portion 100 of the cam 98 to lower the turntable. As the record pulls away from the cartridge stylus, the contacts 173 may open, and the inertia of the motor, and weight of the turntable returns the clamp motor 95 with its cam 98 to the approximate position as shown in Figure 4. At such position the cam 176 has reached the position shown in Figure 7. When this occurs the record is released and the eject lever arm is allowed to eject the record, and open the contacts 154 and 156. Further, it will be seen that the switch contacts 200 and 202 are opened before the link returns to its end position, as shown in Figure 5. The unclamping downward movement of the turntable is assisted by a spring 75 as shown in Figure 4. The contacts 173 will be held closed, until the roller 96 rides off the high point of the cam 98. When the turntable has dropped, and allowed the record to leave the stylus, contacts 173 may open, and in any event the contacts 200 will open as the turntable drops to cut off current to the clamp motor 95. The weight of the turntable, and the roller 96 acting on the slope of the cam 98, together with the spring 75 and inertia of the motor shaft, carry the arm 98 to the position shown in Figure 4, and rotates cam 176 to close the contacts 182.

As soon as the turnable drops sufficiently away from the drive disc, the record stops, and as soon as the contacts 202 open, the drive disc motor 50 stops. Before the turntable reaches its lowest position, the edge of the record engages the flange 29, to release the record from the hub 60, and the eject arm thereupon moves the record off the turntable, opening contacts 154 and 156, the contacts being opened prior to the motor 95 coming to rest and closing contacts 182. The record can be grasped and removed, and another record inserted.

A reject circuit including a reject button 210 may close a circuit through contacts 212 to energize the motor 95. If desired, an alternative reject circuit 214 including button 216 may merely bridge the cam contacts 182.

Figure 8:
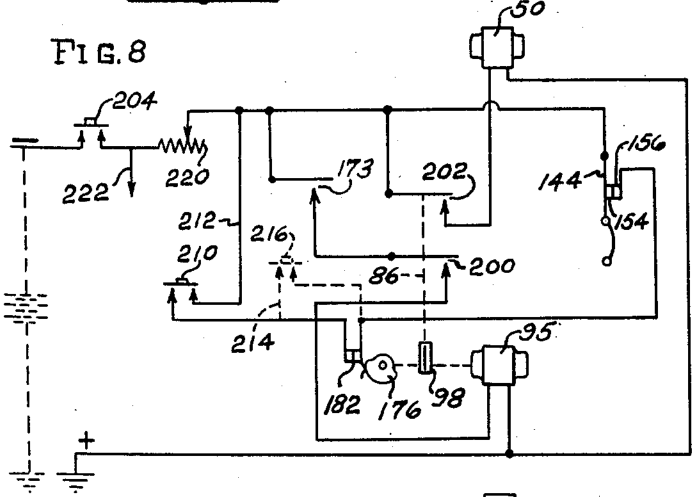
Figure 8 is a circuit diagram.

In the circuit, Figure 8, the adjustable resistor 220 may be set to determine the desired speed of the motor 50. The lead 222 may supply power to the amplifier circuit used to amplify the current derived from the cartridge and such amplifier will thus be energized, when the switch 204 is closed. It will be seen that although the switch 204 be closed, no current will flow in the record player circuits until the contacts 154 and 156 are closed, and once a record is ejected, the circuits are again opened.

It will be seen that the stylus cartridge is free to float in its guide, and moves crosswise of the vehicle so as to be insensitive to acceleration or deceleration. Further the link 86 moves crosswise of the direction of vehicle travel so as likewise to be insensitive to acceleration and deceleration.

Figure 9:
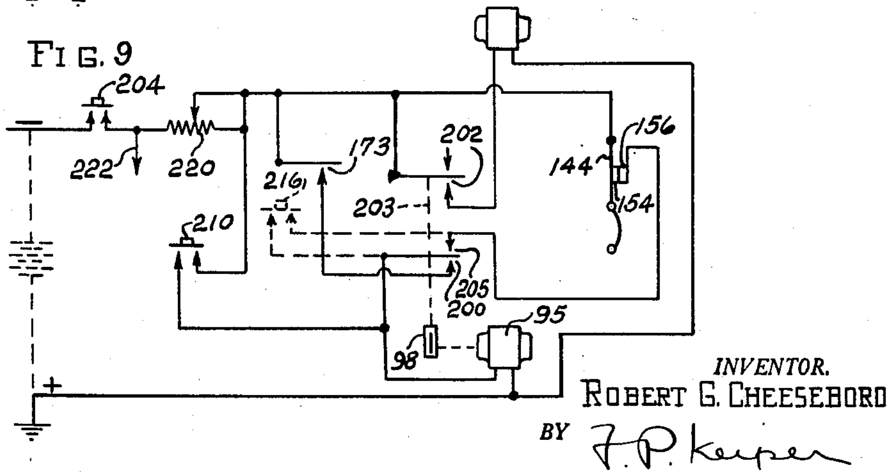
Figure 9 is an alternative circuit diagram.

In Figure 9, an alternative circuit is shown eliminating cam 176, and using an overcenter double pole double throw switch 203. In such circuit as the turntable drops, the switch 203 shifts by overcenter spring action, as the turntable approaches its lower position, and closes contacts 205. This occurs after the turntable has lowered sufficiently to have released the record so that the eject arm will have already ejected the record and opened contacts 154 and 156. It will be seen that the contacts 205 perform approximately the same function as contacts 182 in Figure 8, and that otherwise the circuits of Figures 8 and 9 are similar When a record is inserted, contacts 154 and 156 are closed, completing a circuit through the motor 95, to raise the turntable. As the turntable reaches its upper position switch 203 overcenters, opening contacts 205, and closing contacts 200 and 202. The inertia of the motor assures that the roller 96 will be moved to the arcuate portion 100 of the cam, which portion acts to lock the turntable in clamp position.

It will be seen from the foregoing that there is provided a record player especially adapted for use in automotive vehicles. It will be understood that the needle cartridge will be connected by pigtails to the audio amplification circuit of a car radio, so as to utilize such radio in a manner well understood in the art relating to radio phonographs, or if desired, the cartridge may be connected to a separate amplifier and speaker, the details of which form no particular part of the present invention.

The needle cartridge travels along a path at right angles to the direction of movement of the vehicle so that sudden braking or acceleration does not disturb the cartridge. Further, the lightness of the carriage and cartridge renders it practically insensitive to inertia effects due to road irregularities and jars incident thereto. The turntable lever extending fore and aft of the vehicle resists acceleration and deceleration, and the actuating link, extending transversely of the direction of vehicle motion, is likewise insensitive to acceleration or deceleration.

While a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A record player comprising a motor driven record driving disc, a turntable disposed therebelow and in substantially coaxial relation thereto, means for raising and lowering said turntable into and out of operative relation with said driving disc for clamping or releasing a record therebetween, a needle cartridge track comprising spaced parallel members disposed in fixed relation to and in a plane parallel with the plane of said driving disc substantially radially in relation to said driving disc, and a needle cartridge disposed between the members having rollers engaging said track and adapted to move in a plane normal to the axis of said turntable.

2. A record player comprising a motor driven record driving disc, a turntable disposed therebelow and in substantially coaxial relation thereto, means for raising and lowering said turntable into and out of operative relation with said driving disc for clamping or releasing a record therebetween, a needle cartridge track comprising spaced parallel members disposed in fixed relation to and in a plane parallel with the plane of said driving disc substantially radially in relation to said driving disc, and a needle cartridge disposed between the members having rollers engaging said track and adapted to move in a plane normal to the axis of said turntable between limits constituting beginning of play and end of play positions, said needle cartridge being disposed for needle engagement with the spiral sound track of a disc record when clamped between said turntable and driving disc.

3. A record player comprising a motor driven record driving disc, a turntable disposed therebelow and in substantially coaxial relation thereto, means for raising and lowering said turntable into and out of operative relation with said driving disc for clamping or releasing a record therebetween, a needle cartridge track comprising spaced parallel members disposed in fixed relation to and in a plane parallel with the plane of said driving disc substantially radially in relation to said driving disc, and a needle cartridge disposed between the members having rollers engaging said track and adapted to move in a plane normal to the axis of said turntable between limits constituting beginning of play and end of play positions, said needle cartridge being disposed for needle engagement with the spiral sound track of a disc record when clamped between said turntable and driving disc, and means responsive to the insertion of a record between said disc and table for raising said turntable to clamp a record.

4. A record player comprising a motor driven record driving disc, a turntable located therebelow and disposed substantially coaxial therewith, means for raising and lowering said turntable into and out of operative relation with said driving disc for clamping or releasing a record therebetween, a needle cartridge track comprising spaced parallel members disposed in fixed relation to and in a plane parallel with the plane of said driving disc substantially radially in relation to said driving disc, and a needle cartridge disposed between the members having rollers engaging said track and adapted to move in a plane normal to the axis of said turntable between limits constituting beginning of play and end of play positions, said needle cartridge being disposed for needle engagement with the spiral sound track of a disc record when clamped between said turntable and driving disc, means responsive to the insertion of a record between said disc and table for raising said turntable to clamp a record and means responsive to movement of said needle cartridge inwardly to the end of play position for lowering said table.

5. A record player comprising a motor driven record driving disc, a turntable located therebelow and disposed substantially coaxial therewith, means for raising and lowering said turntable into and out of operative relation with said driving disc for clamping or releasing a record therebetween, a needle cartridge track disposed in fixed relation to and in a plane parallel with the plane of said driving disc substantially radially in relation to said driving disc, and a needle cartridge having rollers engaging said track and adapted to move in a plane normal to the axis of said turntable between limits constituting beginning of play and end of play positions, said needle cartridge being disposed for needle engagement with the spiral sound track of a disc record when clamped between said turntable and driving disc, means responsive to the insertion of a record between said disc and table for raising said turntable to clamp a record, and means responsive to movement of said needle cartridge inwardly to the end of play position for lowering said table, said insertion responsive means being adapted to eject a record upon subsequent lowering of said table.

6. A record player comprising a motor driven record driving disc, a turntable located therebelow and disposed substantially coaxial therewith, means for raising and lowering said turntable into and out of operative relation with said driving disc for clamping or releasing a record therebetween, a needle cartridge track disposed in fixed relation to and in a plane parallel with the plane of said driving disc substantially radially in relation to said driving disc, and a needle cartridge having rollers engaging said track and adapted to move in a plane normal to the axis of said turntable between limits constituting beginning of play and end of play positions, said needle cartridge being disposed for needle engagement with the spiral sound track of a disc record when clamped between said turntable and driving disc, means responsive to the insertion of a record between said disc and table for raising said turntable to clamp a record, means responsive to movement of said needle cartridge inwardly to the end of play position for lowering said table, said insertion responsive means being adapted to eject a record upon subsequent lowering of said table, and means responsive to the operation of said insertion responsive means in ejecting a record for returning the needle cartridge to a beginning of play position.

7. A record player comprising a frame having top and bottom spaced members, a driving disc journalled on and disposed beneath said top member, an arm pivoted at one end upon said bottom member and having its other end disposed beneath the axis of said driving disc, a swivel block mounted on the end of said lever, a turntable journalled on said swivel block in substantially axial alignment with said driving disc, and located therebelow, and means for lifting said swivel block end of said lever for lifting said turntable into operative record clamping relation in respect to said driving disc.

8. A record player comprising a frame having top and bottom spaced members, a driving disc journalled on and disposed beneath said top member, an arm pivoted at one end upon said bottom member and having its other end disposed beneath the axis of said driving disc, a swivel block mounted on the end of said lever, a turntable journalled on said swivel block in substantially axial alignment with said driving disc, and located therebelow, means for lifting said swivel block end of said lever for lifting said turntable into operative record clamping relation in respect to said driving disc, and means for mounting said frame upon an automotive vehicle with said lever extending in the direction of vehicular forward motion.

9. A record player comprising a frame having top and bottom spaced members, a driving disc journalled on and disposed beneath said top member, an arm pivoted at one end upon said bottom member and having its other end disposed beneath the axis of said driving disc, a swivel block mounted on the end of said lever, a turntable journalled on said swivel block in substantially axial alignment with said driving disc, and located therebelow, means for lifting said swivel block end of said lever for lifting said turntable into operative record clamping relation in respect to said driving disc, means for mounting said frame upon an automotive vehicle with said lever extending in the direction of vehicular forward motion, a needle cartridge carriage trackway mounted on said frame and extending normally of the axis of said driving disc and transversely of said lever and disposed in fixed relation to and in a plane parallel with the plane of said driving disc and above said turntable to one side thereof, and a cartridge carriage including a cartridge and record engaging needle disposed for movement in said trackway.

10. A record player comprising a frame having top and bottom spaced members, a driving disc journalled on and disposed beneath said top member, an arm pivoted at one end upon said bottom member and having its other end disposed beneath the axis of said driving disc, a swivel block mounted on the end of said lever, a turntable journalled on said swivel block in substantially axial alignment with said driving disc, and located therebelow, and means for lifting said swivel block end of said lever for lifting said turntable into operative record clamping relation in respect to said driving disc, said means comprising a bell crank, motor driven cam and follower, and interconnecting link.

11. A record player comprising a frame having top and bottom spaced members, a driving disc journalled on and disposed beneath said top member, an arm pivoted at one end upon said bottom member and having its other end disposed beneath the axis of said driving disc, a swivel block mounted on the end of said lever, a turntable journalled on said swivel block in substantially axial alignment with said driving disc, and located therebelow, means for lifting said swivel block end of said lever for lifting said turntable into operative record clamping relation in respect to said driving disc, said means comprising a bell crank, motor driven cam and follower, and interconnecting link and means for mounting said frame upon an automotive vehicle with said lever extending in the direction of vehicular forward motion.

12. A record player comprising a frame having top and bottom spaced members, a driving disc journalled on and disposed beneath said top member, an arm pivoted at one end upon said bottom member and having its other end disposed beneath the axis of said driving disc, a swivel block mounted on the end of said lever, a turntable journalled on said swivel block in substantially axial alignment with said driving disc, and located therebelow, means for lifting said swivel block end of said lever for lifting said turntable into operative record clamping relation in respect to said driving disc, said means comprising a bellcrank, motor driven cam and follower, and interconnecting link, means for mounting said frame upon an automotive vehicle with said lever extending in the direction of vehicular forward motion, a needle cartridge carriage trackway mounted on said frame and extending normally of the axis of said driving disc and transversely of said lever and disposed in fixed relation to and in a plane parallel with the plane of said driving disc and above said turntable to one side thereof, and a cartridge carriage including a cartridge and record engaging needle disposed for movement in said trackway.

13. A record player comprising a motor driven record driving disc, a motor for driving said disc, a record turntable disposed therebelow and adapted to raise and lower to clamp or release a record between the disc and turntable, a needle cartridge disposed for substantially radial movement above the turntable and beneath the disc, power means for raising and lowering the turntable, including a cam switch for establishing a circuit when said turntable is in lowered position, a switch responsive to raising of said turntable for closing a circuit to said motor and establishing a second circuit to said power means for lowering said turntable, a switch in said second circuit adapted to complete said second circuit upon movement of said needle cartridge to an end of play position, and a switch in said first named circuit adapted to be closed upon the presence of a record disposed in fixed relation to and in a plane parallel with the plane of said driving disc and coaxially of and located between said disc and turntable and adapted to complete said first named circuit to said power means to raise said turntable.

14. A record player comprising a motor driven record driving disc, a motor for driving said disc, a record turntable disposed therebelow and adapted to raise and lower to clamp or release a record between the disc and turntable, a needle cartridge disposed in fixed relation to and in a plane parallel with the plane of said driving disc for substantially radial movement above the turntable and beneath the disc, power means for raising and lowering the turntable, including a cam switch for establishing a circuit when said turntable is in lowered position, a switch responsive to raising of said turntable for closing a circuit to said motor and establishing a second circuit to said power means for lowering said turntable, a switch in said second circuit adapted to complete said second circuit upon movement of said needle cartridge to an end of play position, and a switch in said first named circuit adapted to be closed upon the presence of a record disposed coaxially of and located between said disc and turntable and adapted to complete said first named circuit to said power means to raise said turntable, said switch in said first named circuit being yieldingly closed by the presence of a record disposed coaxially in respect to said disc, and adapted to yieldingly eject a record from coaxial alignment upon the lowering of said turntable.

15. A record player comprising a motor driven record driving dsc, a motor for driving said disc, a record turntable disposed therebelow and adapted to raise and lower to clamp or release a record between the disc and turntable, a needle cartridge disposed in fixed relation to and in a plane parallel with the plane of said driving disc for substantially radial movement above the turntable and beneath the disc, power means for raising and lowering the turntable, including a cam switch for establishing a circuit when said turntable is in lowered position, a switch responsive to raising of said turntable for closing a circuit to said motor and establishing a second circuit to said power means for lowering said turntable, a switch in said second circuit adapted to complete said second circuit upon movement of said needle cartridge to an end of play position, a switch having yielding switch actuating arm means for engaging the edge of a record in said first named circuit adapted to be closed upon the presence of a record disposed coaxially of and located between said disc and turntable and adapted to complete said first named circuit to said power means to raise said turntable, said switch in said first named circuit being yieldingly closed by the engagement of a record edge therewith when disposed coaxially in respect to said disc, and said arm means being adapted to yieldingly eject a record from coaxial alignment upon the lowering of said turntable, and means actuated by the ejecting movement of said switch arm means for moving the needle cartridge radially outward from the end of play position.

16. A needle carriage and trackway for phonograph record players, comprising a trackway composed of laterally spaced parallel tracks, each comprising vertically spaced parallel guides, a needle carriage adapted to roll in spaced parallel trackways comprising a pair of spaced parallel rollers of a length commensurate with the lateral spacing between the parallel tracks, said rollers having reduced diameter end portions of a diameter slightly less than the spacing between said vertically spaced guides, a V wire spring for each roller having inwardly bent ends inserted into the ends of said rollers to form pintles therefor, said springs being oppositely disposed and lying substantially in a common plane with their apices adjacent, a needle cartridge disposed between the apices of said springs, and means for mounting the cartridge to each of said springs at the apex thereof, and a switch mounted on one end of the trackway and having an actuating arm adapted to be engaged by a carriage roller on movement of the carriage in response to the spiral soundtrack feed of a disc record.

17. A needle carriage and trackway for phonograph record players, comprising a trackway composed of laterally spaced parallel tracks, each comprising vertically spaced parallel guides, a needle carriage adapted to roll in said trackway comprising a pair of spaced parallel rollers of a length commensurate with the lateral spacing between the parallel tracks, said rollers having reduced diameter end portions of a diameter slightly less than the spacing between said vertically spaced parallel guides, a V wire spring for each roller having inwardly bent ends inserted into the ends of said rollers to form pintles therefor, said springs being oppositely disposed and lying substantially in a common plane with their apices adjacent, a needle cartridge disposed between the apices of said springs, and means for mounting the cartridge to each of said springs at the apex thereof.

18. A needle carriage adapted to roll in spaced parallel trackways, comprising a pair of spaced parallel rollers having reduced diameter end portions, a V wire spring for each roller having inwardly bent ends inserted into the ends of said rollers to form pintles therefor, said springs being oppositely disposed and lying substantially in a common plane with their apices adjacent, a needle cartridge disposed between the apices of said springs, and means for mounting the cartridge to each of said springs at the apex thereof.

References Cited in the file of this patent

UNITED STATES PATENTS

| | | |
|---|---|---|
| 2,092,668 | Goldsmith | Sept. 7, 1937 |
| 2,100,686 | Collaro et al. | Nov. 30, 1937 |
| 2,340,418 | Gabel | Feb. 1, 1944 |
| 2,518,232 | Giovannucci et al. | Aug. 8, 1950 |
| 2,532,293 | De Weese | Dec. 5, 1950 |
| 2,676,808 | Masterson | Apr. 27, 1954 |